UNITED STATES PATENT OFFICE.

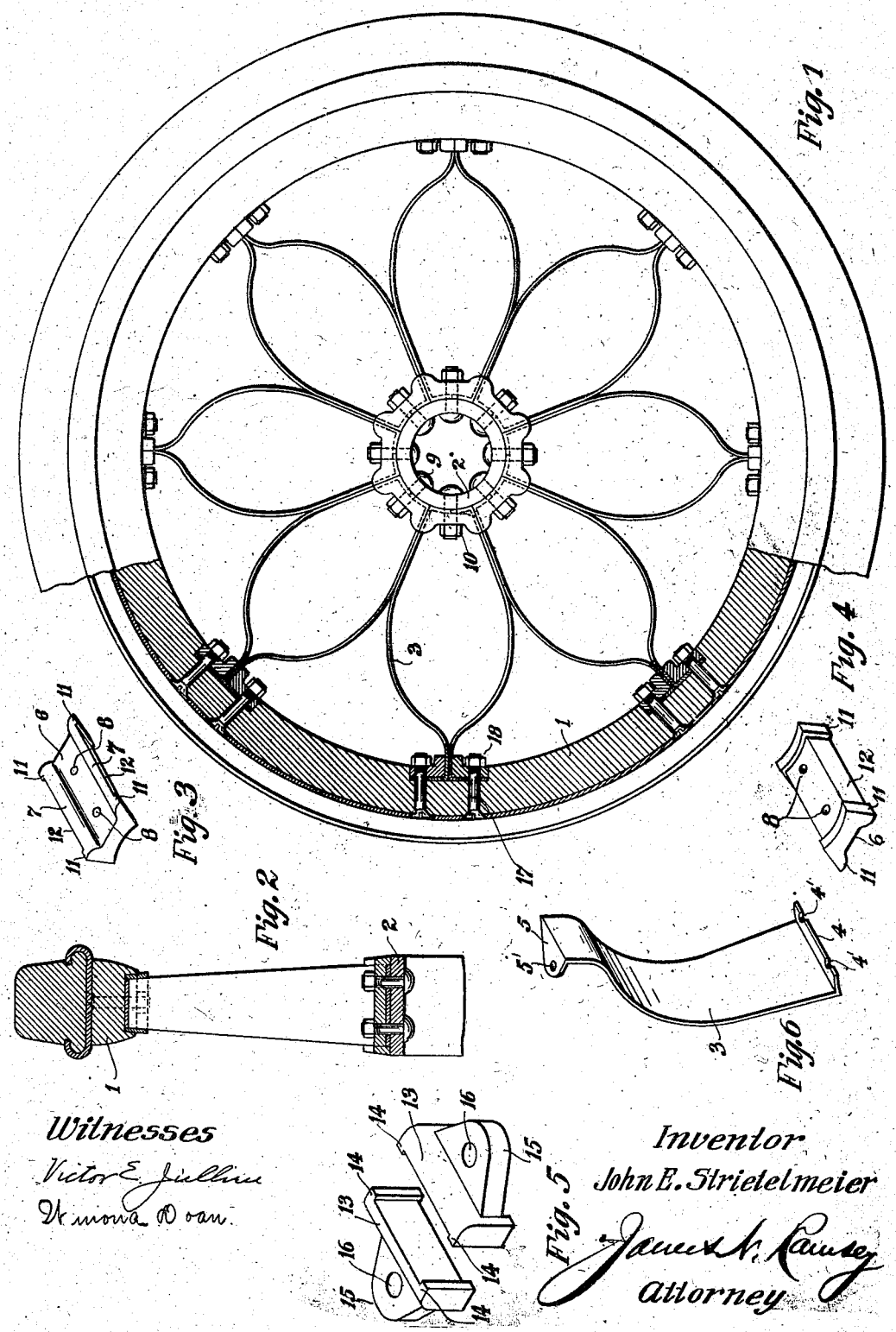

JOHN E. STRIETELMEIER, OF CINCINNATI, OHIO, ASSIGNOR TO THE IDEAL WHEEL COMPANY, OF CINCINNATI, OHIO, A CORPORATION OF OHIO.

WHEEL.

1,179,974.  Specification of Letters Patent.  Patented Apr. 18, 1916.

Application filed June 8, 1911. Serial No. 631,905.

*To all whom it may concern:*

Be it known that I, JOHN E. STRIETELMEIER, a citizen of the United States, and a resident of Cincinnati, in the county of Hamilton and State of Ohio, have invented certain new and useful Improvements in Wheels, of which the following is a specification.

My invention relates to improvements in the construction of wheels for various purposes and more particularly for use upon automobiles and other conveyances.

The object of my invention is to provide a strong, compact, neat, efficient, durable, resilient wheel either with or without a cushion or pneumatic tire.

With these and other objects in view, my invention consists in a wheel comprising a rim, a hub, a series of springs each engaging the adjacent spring on one side thereof a part of its length, and engaging the adjacent spring on the other side thereof a part of its length at its other end, and means for securing said spring spokes in firm, fixed relation with said hub and rim respectively.

My invention also consists in providing spring spokes curved intermediate of their ends, and provided with an angular extension upon each end, clamps adapted to engage said extensions, and bolts and nuts adapted to secure said clamps to said hub and rim respectively.

My invention also consists in the parts, and in the peculiar construction, combination and arrangement of parts as herein set forth and claimed.

In the drawing which serves to illustrate the construction and arrangement of my invention as applied to a wheel: Figure 1 is a view partly in elevation and partly in section, the tire being omitted from the sectional part. Fig. 2 is a sectional view. Figs. 3 and 4 are perspective views of one of the clamps for securing the springs to the hub, and Fig. 5 is a perspective view of a pair of clamps used in securing the ends of the springs to the rim of the wheel. Fig. 6 is a perspective view of one of the spring spokes.

In the embodiment of my invention as illustrated and which shows a preferred construction of wheel which is especially adapted for use upon an automobile, 1 represents the wooden rim of the wheel, and 2 the metallic hub. The flat, resilient, metallic spring spokes 3 curved between their ends are each provided with an angular extension or flange 4 and 5 at their inner and outer ends respectively to serve as retaining members. The flange 4 of each spring spoke 3 is provided with semi-circular notches 4' and each flange 5 is provided with an opening 5'. The curvature of the several springs comprising the spring spokes of a wheel made in accordance with my invention is such that the two adjacent spring spokes will engage each other at their outer or rim ends a short distance of their length, and then diverge away from each other and into engagement with other similar spring spokes, said engagement extending over a considerable distance of the inner portions of said spring spokes. The spring spokes 3 are preferably formed substantially flat in cross section, and taper from the hub to the rim, as clearly shown in Fig. 2. The spring spokes are disposed with their flat longitudinal dimensions transversely of the rim and hub respectively.

A clamp 6 comprising a segmental plate, having ribs 7 and bolt openings 8 is adapted to be placed between the springs and upon the flanges thereof to clamp them to the hub 2 by bolts 9 and nuts 10, as shown. Each clamp is provided with lugs 11 to form recesses 12 upon opposite sides and the bottom thereof, for the purpose of forming, in connection with the recess in the adjacent clamp, a channel to receive and hold each spring spoke from lateral movement.

Clamps 13 having lugs 14 adapted to form recesses between each pair of said clamps to receive the outer or rim ends of the spring spokes are secured to the rim by means of ears 15, bolts 17 passing through bolt holes 16 and secured by nuts 18.

The formation of the lugs and corresponding intervening recesses upon the hub and rim clamps respectively provide efficient means for holding both ends of the flat spring spokes tightly in position and against lateral or sidewise movement relatively to the clamps, hub and rim.

The construction of wheels made in accordance with my invention enables me to secure a maximum of strength and resiliency with a minimum of parts, and provides the greatest facility for easily, quickly and conveniently assembling the parts into operative position, and of removing a broken part and replacing the same if such a contingency should arise, without the use of special tools or skill.

It will be observed that both ends of each spring being flanged and curved with a clamp securely bolted thereon, effects an absolutely secure fastening, and that the adjacent lugs of each pair of clamps engage each other and form slots or channels through which the ends of the spring spokes pass and are held from movement in any direction. This construction is convenient and prevents the dirt or dust or other substance from accumulating to mar the beauty or usefulness of the wheel. The same is true of the construction both of the hub and the rim fastenings.

The formation of each pair of spring spokes is substantially straight during a considerable length thereof from the hub outwardly, so that a spring spoke of each pair of spring spokes abuts the adjacent spring of the next pair of spring spokes over a considerable portion of its length and thus each affords a brace or support for the other, so that the entire series being supported and braced in this manner a substantially unitary bracing and yielding effect is obtained, whereby when there is pressure or yielding upon any one part of the wheel, the same will be uniformly distributed throughout the wheel, so as to minimize the strain upon the parts separately and permit the force of a jar or strain to be borne by all of the spring spokes. This construction providing for said engagement of the adjacent springs of the several pairs of spring spokes respectively, being at the inner or central part of the wheel, is not liable to accumulate any dust or dirt particles between said spokes, and said spring spokes converging toward each other from near their central part outwardly and engaging each other at the ends where they are secured to the rim by and between the clamps effects a neat and efficient construction of the springs and connection thereof to the rim. This particular construction is not only neat and attractive in appearance, but by reason of its simplicity and fewness of parts, reduces liability of contact with mud to the minimum.

The flanged end construction of the spring spokes which are clamped and bolted in position affords an absolutely sure and safe connection of the spring spokes to the hub and rim respectively, and one which is easily effected, both in the original assembling of the wheel and in the replacing of any parts thereafter.

A wheel constructed in accordance with my invention is extremely light, strong, resilient and durable, and can be constructed more economically than otherwise.

While I have shown eight pairs of spring spokes in the wheel as illustrated, these may be varied in number, size and shape as may be desired, the number depending greatly upon the size of the wheel and also the strength of the wheel desired. It is noteworthy that these spokes are characterized by a pronounced width compared with the wheel dimensions; to wit: in the embodiment illustrated the average width of each spring is not materially less than one-fifth the distance from the wheel-axis to the inner periphery of the rim, and these wheel elements are all located in the same plane and each emerge radially in straight portions at the point of attachment to the hub and are convergingly shaped in pairs to form a series of loop-like spokes.

Wheels constructed in accordance with my invention are not only desirable for use on automobiles, but also for vehicles of various kinds, including railway and traction cars as well as for pulleys and may be used to great advantage for use on aeroplanes, as the use of same will greatly ease the shock in landing.

Various modifications of my invention may be made without departing from its spirit or scope, and I do not, therefore, wish to be limited to the exact construction shown.

I claim:

1. A spring wheel of the nature disclosed combining a hub, a rim, a plurality of leaf springs of approximately the same width throughout each equal in width to the hub and each radiating in the same plane from hub to the rim, said springs being conversely arranged in pairs, the springs of each pair having their hub ends widely separated and their rim-ends close together to form a series of looped spokes each having a circumferentially wide base at the hub and converging together at the rim; each loop formed by said spokes having its maximum width approximately midway the periphery of the hub and the rim.

2. A resilient wheel of the nature disclosed, combining a rim, a hub and a series of spring-spokes, each composed of two homologous spring-units arranged edgewise to the plane of the wheel and symmetrically related to the radial center-line of the two-part spring-spoke, the two units forming each spoke being widely spaced at the hub and converging toward one another at the rim, each spring-unit having at its hub-end a flange directed toward said center-line and at its rim end a flange directed away from said center-line, and means pressing in a radial direction on said flanges for securing said flanges to the rim and hub respectively.

3. A spring wheel of the nature disclosed combining a hub, a rim, a plurality of leaf springs each equal in width to the hub and each radiating from the hub to the rim, said springs being conversely arranged in pairs, the springs of each pair having their radial hub-portions widely separated and their rim-ends close together to form a series of looped spokes each having a circumferentially wide base at the hub and converging together at the rim; each loop formed by said spokes having its maximum width approximately midway the periphery of the hub and the rim; each of said springs terminating at the hub and rim in laterally extending flanges, and means drawing said flanges radially toward said hub and rim respectively.

4. A resilient wheel of the nature disclosed, combining a rim, a hub and a series of spring-spokes, each composed of two homologous spring-units symmetrically related to the radial center-line of the spring-spoke, the two units forming each spoke being widely spaced at the hub and converging toward one another at the rim, each spring unit having at its hub end a flange directed toward said center-line and at its rim end a flange directed along the inner periphery of the rim, and radially acting means for clamping said flanges to the rim and hub respectively.

5. A resilient wheel of the nature disclosed, combining a rim, a hub and a series of spring-spokes, each composed of two homologous spring-units symmetrically related to the radial center-line of the spring-spoke, the two units forming each spoke being widely spaced at the hub and converging toward one another at the rim, each spring-unit having at its hub end a flange directed toward and terminating at said center-line and at its rim end having a flange directed along the inner periphery of the rim, blocks for backing said flanges to the rim and hub respectively, and radially disposed bolts for forcing said blocks in a radial direction.

6. A wheel comprising a hub, a rim, flat curved spring spokes extending from said hub to said rim, such spring spokes being bent to form a flange at their ends extending from one side of the spring spoke at the hub and the opposite side thereof at the rim, fastening members at said hub and said rim, being grooved to securely engage the spring and flange thereof on one side of the spring spoke in such manner that the opposite side abuts against the adjoining spring spoke which is held by a similar fastening member on its opposite side, such fastening members being connected to said hub and rim by means of bolts and nuts.

7. A spring wheel of the nature disclosed combining a hub, a rim, a plurality of leaf spring-units each of radial length and all the spring-units in said wheel radiating in a common plane from the hub to the rim, said springs taken in alternate succession being conversely arranged to form a series of looped two-part spokes each having a circumferentially wide base at the hub and converging together at the rim; each loop formed by said spokes having its maximum width approximately midway the periphery of the hub and the rim.

8. A resilient wheel of the nature disclosed, combining a rim, a hub and a series of spring-spokes, each composed of two homologous spring-units arranged edgewise to the plane of the wheel and symmetrically related to the radial center-line of the spring-spoke, each spring-unit having at its hub-end a flange directed toward said center-line, a radially movable block to clamp said flange onto said hub, the ends of each pair of spring units taken in succession abutting one another at the rim, and means for detachably securing said ends to the rim.

9. A spring wheel of the nature disclosed combining a hub, a rim, a plurality of leaf spring-units each equal in width to the hub and each spring-unit radiating from the hub to the rim in the same radial plane, said springs being conversely arranged in pairs to form a series of two-part looped spokes each having a circumferentially wide base at the hub and progressively converging together at the rim; the ends of the spring units at each point of convergence being clamped together flatwise, means at the rim for detachably holding said ends in clamped relation to said rim; each of said spring-units terminating at the hub in laterally extending flanges, and detachable means drawing said flanges radially toward said hub.

10. A resilient wheel of the nature disclosed, combining a rim, a hub and a series of spring-spokes, each composed of two homologous spring-units symmetrically related to the radial center-line of the spring-spoke, the two units forming each spoke being widely spaced at the hub and converging toward one another at the rim, each spring unit having at its hub end a flange directed toward said center-line and at its rim end a flange directed along the inner periphery of the rim, and detachable radially acting means for clamping said flanges to the rim and hub respectively.

11. A resilient wheel of the nature disclosed, combining a rim, a hub and a series of spring-spokes, each composed of two homologous spring-units symmetrically related to the radial center-line of the spring-spoke, the two units forming each spoke being widely spaced at the hub and converging toward one another at the rim, each spring-unit having at its hub-end a flange directed toward and terminating at said center-line and at its rim end terminating in a flange directed along the inner periphery of the rim, detachable blocks for backing said flanges to the rim and hub respectively, and radially disposed screw bolts for forcing said blocks in a radial direction.

12. A resilient wheel of the nature disclosed combining a hub, a rim, and an equispaced series of loop-like composite spokes, all radiating in the same plane therebetween, each spoke consisting of two homologous forward and rear springs formed of wide sheet metal conversely arranged edgewise to the plane of the wheel, and rigidly secured to the hub along axially parallel lines widely separated circumferentially whereby each spoke has a wide base both peripherally and axially, said springs emerging radially from the hub and progressively curving toward the center line of their spoke and having their outer extremities terminating at an obtuse angle with the periphery of said rim, the radial portion of the rear spring of each spoke being flatwise in direct contact with the radial portion of the forward spring of the following spoke, and fastening means for securing the two similar springs of each spoke to the hub and rim respectively.

13. A spring wheel of the nature disclosed combining a felly, a hub, a series of pairs of spoke-fasteners equispaced around the inner periphery of the felly, each pair being composed of two similar closely adjacent fasteners secured to the felly and arranged at the inner periphery thereof, an equal series of pairs of resilient sheet-metal strips curved and symmetrically arranged edgewise to the plane of the wheel to form loop-like spokes, the one strip extending clock-wise around its fastener and the other strip extending anti-clockwise around its fastener, each strip curving away from the radius line extending through its fastener, and then approaching the hub along a radius line extending midway its fastener and the adjacent one of the neighboring pair, and means for securing said strips to the hub.

14. A spring wheel of the nature disclosed combining a felly, a hub, an equispaced succession of pairs of spoke-fasteners, each pair being composed of two fasteners mounted closely adjacent one another at the inner periphery of the felly, an equal number of pairs of resilient sheet-metal strips symmetrically arranged edgewise to the plane of the wheel to form loop-like spokes, each strip emerging radially from the hub along a line radially midway two pairs of fasteners and progressively curving away from said line and finally extending between the two fasteners composing the adjacent pair and then following the contour of the adjacent fastener to pass between the same and the felly, and means for securing said strips to said hub.

15. A spring wheel of the nature disclosed combining a hub, a felly, a series of loop-like spring spokes, each formed of two strips of flat metal having radial portions adjacent the felly extending in contact radially toward the hub and abruptly spreading apart at a short distance from the inner periphery of the felly and curving toward and approaching the hub with straight radial portions, the said two portions of each spoke being widely separated and each contacting back-to-back with the adjacent portion of the adjacent spoke, a series of wedge-blocks, each arranged between two widely separated portions, and fastening devices, each engaging the contacting radial portions of the spoke-strips at the rim.

16. A spring wheel of the nature disclosed combining a hub, a felly, and spring spokes secured thereto, each made up of two portions widely separated at the hub and close together at the felly, said hub comprising a body portion and a series of blocks equal in number to the spokes around the hub circumference and having radial sides, the adjacent blocks being separated a distance equal to twice the thickness of the material of the spokes and each spoke having the ends of its two portions bent at such an angle to each other and so separated as to fit against opposite sides of a block, means at the felly radially opposite each block for securing the closely adjacent spring-portions to the felly, and means for securing blocks in place.

17. A spring wheel of the nature disclosed combining a hub, a felly, a series of loop-like spring spokes each formed of two strips of resilient metal converging together and terminating in portions at the felly in radial face-to-face contact, a fastening means circumscribing said radial portions, and means securing the strips to the hub.

18. A spring wheel of the nature disclosed combining a hub, a felly, a fastening device retained at the felly and providing an aperture extending radially, a pair of sheet metal resilient spoke-elements having radial contacting portions extending through said aperture and retained against radial movement by said fastening device, said spoke-elements curving abruptly apart upon emerging from said aperture and then immediately curving reversely and gradually and having their hub-portions widely separated, and means for securing said spoke-elements to the hub.

19. A spring wheel combining a hub; a rim; and a plurality of sheet metal springs each radially emerging in straight portions from attachments to the hub, and then convergingly shaped in pairs to form a series of loop-like spokes, all located in the same plane, the average width of each spring being not materially less than one-fifth the distance from the wheel-axis to the inner periphery of the rim.

JOHN E. STRIETELMEIER.

Witnesses:
  JAMES N. RAMSEY,
  WINONA DOAN.